July 29, 1969

W. R. SCHELL 3,458,701

CRYOGENIC GAS COUNTING APPARATUS

Filed Oct. 29, 1965

INVENTOR.
William R. Schell
BY

Attorneys

United States Patent Office 3,458,701
Patented July 29, 1969

---

3,458,701
CRYOGENIC GAS COUNTING APPARATUS
William Raymond Schell, Mountain View, Calif., assignor, by mesne assignments, to the United States of America as represented by the Secretary of the Air Force
Filed Oct. 29, 1965, Ser. No. 505,641
Int. Cl. G01t 1/205, 1/17
U.S. Cl. 250—83
7 Claims

ABSTRACT OF THE DISCLOSURE

A counter for measuring radiation wherein a radioactive gas is introduced into a chamber which has an opening sealed by a membrane, the central portion of the membrane, the central portion of the membrane is in partial contact with a cold surface of a cryostat assembly and causes the radioactive gas to form a condensate on the cooled portion of the membrane and means for measuring the radiation from the condensate.

---

This invention relates to a cryogenic gas counting apparatus and method for measuring emanations from radioactive gas samples.

Radioactive gases are formed in the atmosphere naturally by cosmic particle interaction with the atmospheric gases. This natural level of radioactivity has been artifically increased in recent times due to debris from atomic explosions. It is often desired to measure the levels of natural radioactivity and of artificial radioactivity to determine the relative composition of the constituents of the radioactive species in the atmosphere. Natural levels of radioactivity are difficult to measure because of dilution in the atmosphere and because of the low energy of the beta decay emanations characteristic of important tritium and carbon 14 species. The level of artificial radioactivity, such as due to each of the noble gas contituents of the atmosphere, is very small, and requires exceptionally sensitive measurements for the detection and energy resolution of such radiations.

Heretofore, radioactive gas counters for the purpose of analyzing the energies and count rates of radioactive gas samples have preferably been of the proportional type employing the inner ionization chamber for counting the sample gas. The inner chamber is surrounded by extensive shielding and guard or anti-coincidence chambers for lowering the background counts due to cosmic rays, etc. Cosmic rays have such a large energy that they can pass easily through both anti-coincidence chambers as well as the inner ionization chamber to thereby generate events in all three chambers. Coincidence of events in surrounding chambers is utilized to blank the response in the inner chamber. Such counters require very high voltages for operation in the proportional region (e.g. 2 kv.–10 kv.). This necessitates the use of maintenance of high voltage power supplies and other associated equipment. Such proportional counters also require a large sample of the gas to be analyzed, often as much as a liter or more. The procurement of such a large sample is often inconvenient and expensive.

Furthermore, for some gases, such as carbon dioxide, operation in the proportional region possesses severe disadvantages due to electronegativity or spontaneous breakdown of the gas leading to false counting and the like. To overcome electronegativity, the isotopic species has heretofore had to be converted into a form not exhibiting this character, such as the conversion of $CO_2$ to methane. But the latter conversion caused other problems including the difficult achievement of quantitive or complete conversion, etc.

There is, therefore a need for a new and improved radiation detector and counting apparatus for measuring radioactive emanations from gases and vapors.

Accordingly, it is an object of the invention to provide an improved radioactive gas counting apparatus and method which will overcome the above named disadvantages.

Another object of the invention is to provide a counting apparatus and method of the above character which can count small quantities of radioactive gaseous samples, such as rare gas isotopes.

Another object of the invention is to provide a counting apparatus and method of the above character which does not require extensive shielding, and yet has a low background count rate.

Another object of the invention is to provid a counting apparatus and method of the above character which does not require anti-coincidence chambers or associated electronics to reduce background count rates created by cosmic rays.

Another object of the invention is to provide a counting apparatus of the above character which does not require high voltages for its operation.

Another object of the invention is to provide a gas counting apparatus of the above character in which a number of different counting geometries can be utilized.

Another object of the invention is to provide a gas counting apparatus of the above character which is lightweight and portable.

Another object of the invention is to provide a counting apparatus of the above character which is relatively simple and rugged in construction.

Another object of the invention is to provide a counting apparatus and method of the above character which can count water vapor or $CO_2$ samples directly without the need for converting such samples to another gaseous form.

These and other objects of the invention will be apparent from the following description when taken in conjunction with the accompanying drawings of which:

In general, in practicing the method of the present invention, the gas sample to be measured is introduced into a chamber having a small, cold surface therein cooled to a low or cryogenic temperature, for example that of liquid nitrogen. The gas sample condenses and freezes on the cold surface. When the pressure in the chamber indicates that the sample is completely condensed on the surface, the radiations from the condensed sample are measured by a solid state detector.

Figure 1:
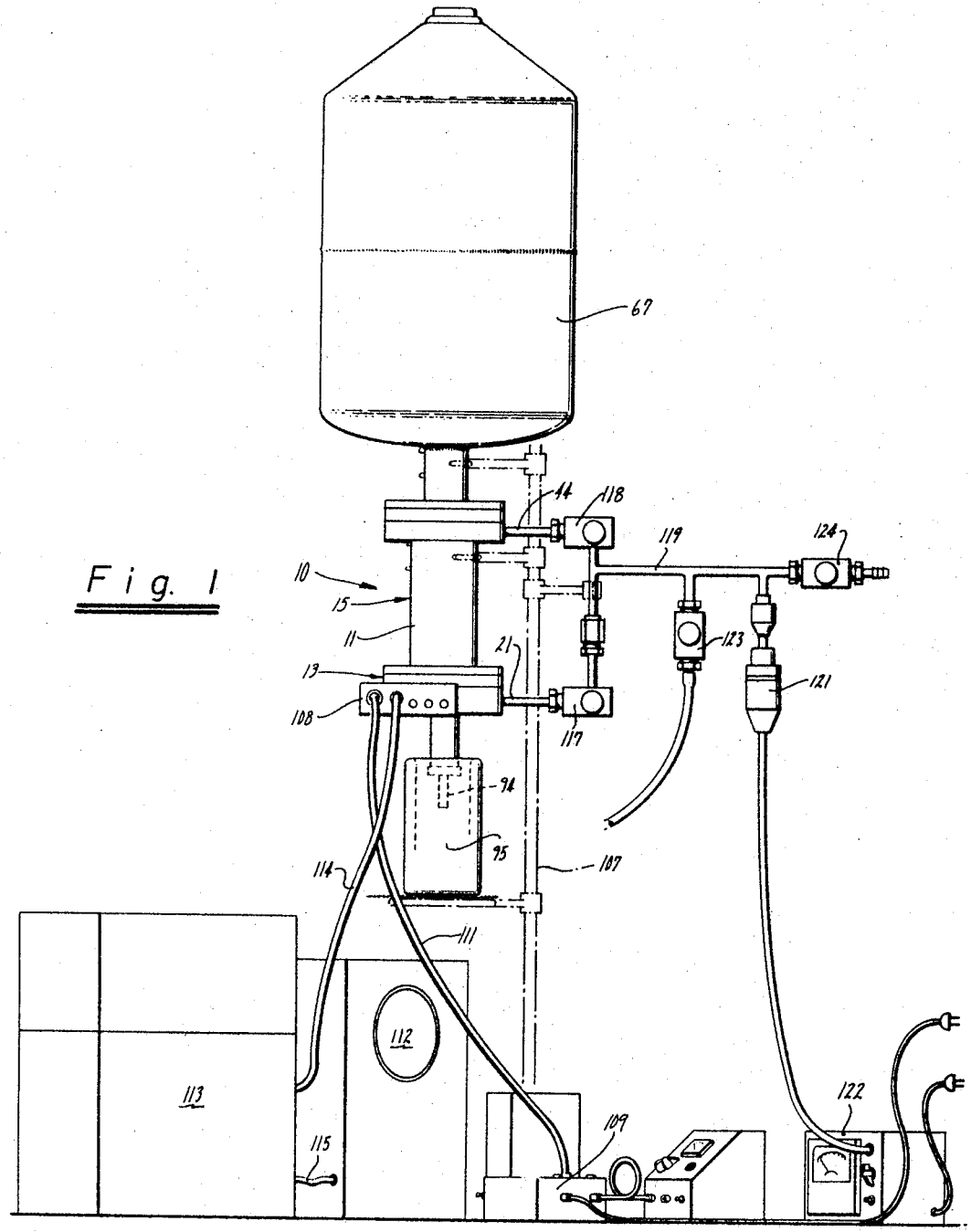
FIGURE 1 is a front elevational view of a table top arrangement of a counting apparatus incorporating the present invention, and including a novel cryogenic counter forming a part thereof.
Figure 2:
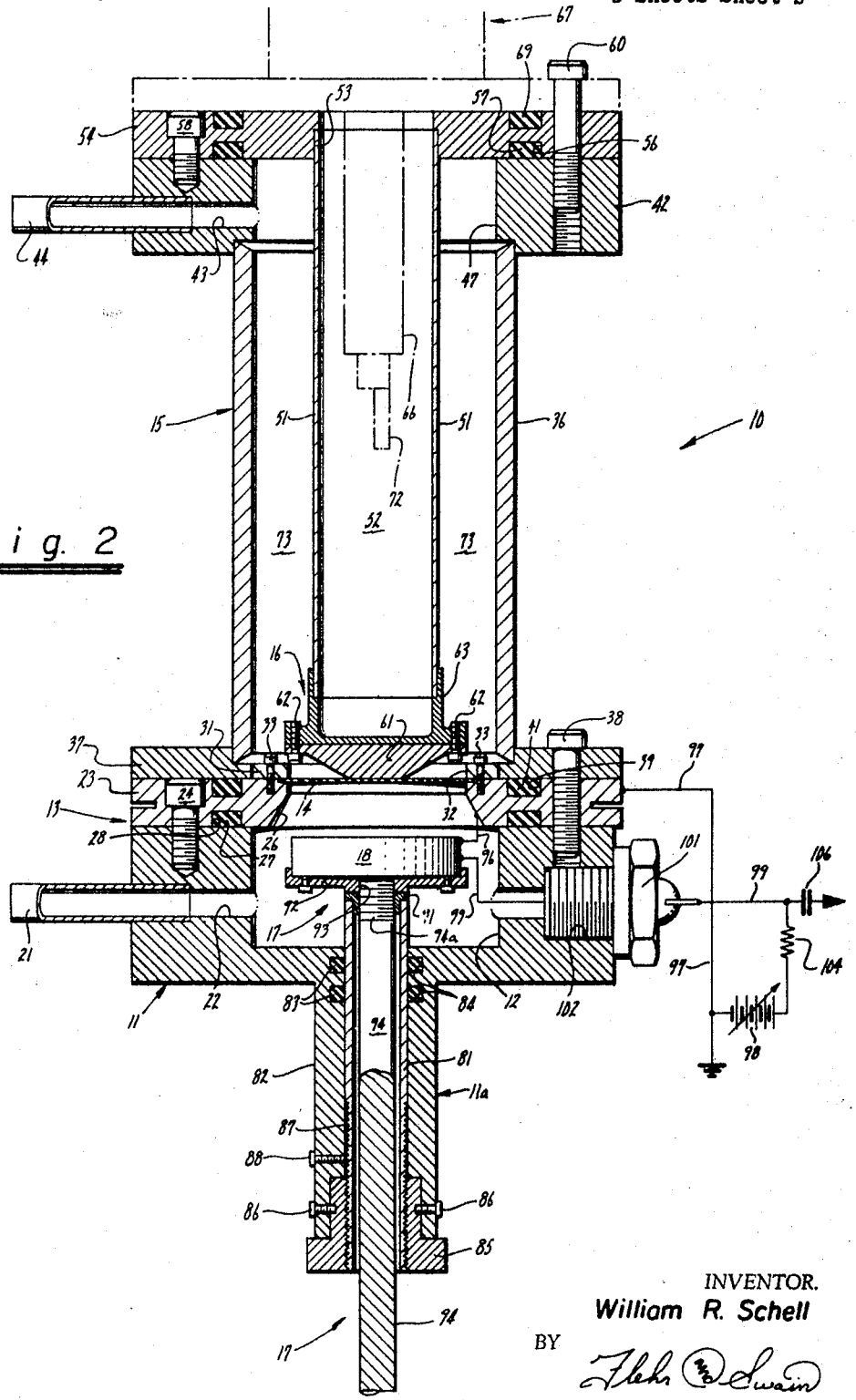
FIGURE 2 is an elevational view in cross-section of the cryogenic counter constructed according to the invention.

Referring now more particularly to the cryogenic gas counting apparatus shown in FIGURES 1 and 2, there is shown a cryogenic gas counter 10 including a housing 11 having a cylindrical chamber 12 formed therein having an opening at its upper end. An assembly 13 mounting a membrane 14 is secured to the top of the housing so that the membrane covers the opening. A cryostat assembly 15 is mounted on the top of the assembly 13 and has a lower portion cooled to liquid nitrogen temperature and disposed at the opening in the housing and in physical and thermal contact with the membrane 14 so that the central portion of the membrane is cooled to liquid nitrogen temperature. Thus, a gas admitted into the chamber is preferentially condensed on the cold portion of the membrane. The membrane 14 has a low thermal conductivity so that its central portion is relatively well insulated from its mounting assembly 13, the housing 11, and the remainder of the apparatus.

A lower portion 11a of the housing mounts a detector assembly 17 which is adapted to move a radiation detector 18 into close proximity to the membrane 14 after the gas sample has been condensed thereon to thereby measure the radioactive emanations therefrom.

More particularly, the housing chamber 12 is cylindrical in form and has a volume of approximately fifty cubic centimeters. A pipe 21 serving as gas inlet and outlet is mounted in a bore 22 in the sidewall of the housing 11. The pipe 21 is connected through suitable piping and valving, hereinafter described, to a vacuum source (not shown) and sample source (not shown) for producing a vacuum in the housing or admitting a gas sample therein.

Means are provided for mounting the membrane 14 in gastight relation over the opening in the housing 11. Such means consists of a thick ring-like member 22 having an outer diameter approximately the same as the housing 11 and secured to the top of the housing by a plurality of cap screws 24 which are counter sunk below the upper surface of the member 23, one unit of which is shown. The member 22 is provided with a circular opening 26 centrally therethrough which is in registration with the open end of the housing 11. An O-ring seal 27 lies in a circular groove 28 provided in the lower base of the member to thereby make sealing contact with the upper surface of the housing 11.

An annular washer-like member 31 having an outside diameter substantially smaller than that of the ring-like member 23, and having an opening 32 of a diameter approximately the same as the upper portion of the opening 26 in the member 23 is secured to the top of the member 23 by screws 33 so that the opening 32 lies in registry with the opening 26. The membrane 14 is tightly bonded between the members 23 and 31 to close the top of the opening 26 in the member 23 and seal off the chamber 12.

The membrane 14 is formed of any gas impervious form having the property of low thermal conductivity and high strength when cooled to cryogenic temperatures. A preferred form is a thin plastic film coated on both sides wtih a film of thermoplastic adhesive. One suitable thermoplastic coated film is that provided by the Schjeldahl Company, Northfield, Minn., and distributed under the designation of GT–400. This is a polyester film (polyethylene terephthalate) having a coating which is heat sealable at 160° C. The membrane is sealed in place between the ring-like members 22 and 31 by frictional compression and also by the adhesive bond between the membrane and the members. The bond produced by the adhesive is formed by heating the assembly 13 (ring-like members 22 and 31 and member 14) to the heat of sealing of the adhesive to thereby form a strong, vacuum-tight unit. The assembly 13 is then secured to the top of the housing, the lower surfaces being adapted to receive an O-ring seal contacting housing 11 and maintaining a vacuum-tight relationship therebetween. It is seen that the entire membrane assembly 13 can be easily and readily removed and replaced as a unit to thereby permit access to the inner regions of the chamber 12 and to the detector 18.

The cryostat assembly 15 includes a hollow cylindrical jacket 36 terminating in an outwardly extending mounting flange 37 at its lower portion. The flange 37 is provided with an opening therein so that the inner volume of the jacket is in registry and communication with the opening 32 in the member 31. The flange 37 is retained to the member 22 by cap screw 38. The member 22 has a circular groove 39 on its upper side for retaining an O-ring seal 41 which sealably contacts the lower side of the flange when the latter is pulled against the ring 22 by the screws 38. A mounting block 42 is secured to the upper end of the jacket and extends radially outwardly therefrom. The mounting block has a bore 43 in its sidewall for mounting a pipe 44 which is connected to a vacuum line as hereinafter described. The block 42 has a central opening 47 therein which is in registry with the inside of the jacket 36.

A hollow, elongate, cylindrical container 51 for providing a well 52 of liquid nitrogen in thermal contact with a portion of the membrane 14 is sealed into and depends centrally from an opening 53 in a ring-like member 54 extending outwardly from the upper portion of the container. The ring-like member 54 has a groove 56 in its lower surface for retaining an O-ring seal 57; the container and ring being mounted on the top of the mounting block 42 by cap screws 58 counter sunk into the ring. The lower portion 16 of the container comprises a thermally conductive member 61 such as copper. The member 61 is secured to a cap 63 by screws 62 closing the lower end of the container and forming the bottom thereof. The member 61 is tapered downwardly and inwardly to form a small lowermost surface which lies in thermal and physical contact with the central portion of the membrane 14 to thereby cool that portion thereof.

The container 51 is open at its upper end so that the wall therein lies in registration with the opening 53 and the ring-like member 54 to thereby admit a feed portion 66 of a cryostat 67 which is fastened to the ring-like member 54 and by a plurality of cap screws 60, and sealed thereto by means of an O-ring seal 69 carried in a circular groove provided in the upper surface of the member 54. A particulraly suitable cryostat 67 is that provided by the Linde Company and designated as model Cr–10. The feeder portion 66 has a discharge pipe 72 adapted to extend downwardly into the container 51 and maintain the level of liquid nitrogen within the container at a predetermined value. It will be seen that the container 51 and jacket 36 are spaced apart and concentric with respect to each other to thereby define together with the member 54 and membrane 14 an annular chamber 73 for retaining a vacuum therebetween for thermally insulating the container and well from the ambient temperature.

The detector assembly includes a hollow stem 81 mounted in the downwardly depending extension 11a of the housing 11 for linear motion longitudinally therein. The stem 81 is sealed in gastight relation within the extension by O-rings 83 set in annular grooves 84 provided in the inside wall of the extension 11a. The lower outer portion 87 of the stem 81 is threaded for engagement by a nut 85 rotatably mounted on screws 86 extending through the lower sidewall of the extension 11a. A slot longitudinally along the outer wall of the stem 81 is engaged by a pin 88 so that the stem is restrained against rotation and must move linearly.

The upper portion of the stem 81 is capped with a stainless steel spacer 91 supporting a mounting base 92 thereon which is adapted to receive and mount the detector 18. The bottom of the base 92 has a threaded well 93 therein opening to the inside of the stem 81 through a hole provided centrally in the spacer 91. The well receives a cold finger 94 having correspondinng threads at its upper end 94a. The fingers 94 is long enough to extend downwardly away from and out of the stem 81 so that the finger 94 may be immersed in a cold bath 95 as hereinafter explained.

The detector 18 is mounted on the upper surface of the base 92. The detector 18 includes a case carrying a radiation sensitive semiconductor therein. The semiconductor is preferably the lithium drifted type having a depletion region in a silicon junction semiconductor in a known manner. Such a detector is commercially available, for example, from Technical Measurements Corp. by specifying the detector area, depth, and required resolution. For maximum resolution and minimum noise, this type of detector requires a bias voltage of the order of a few hundred volts and cooling to fairly low temperatures.

The P side of the detector semiconductor is connected by wire 96 to the ring-like member 23, and thence through conductor 97 to the grounded negative terminal of a variable D-C voltage source 98. The other, N side of the semiconductor is connected by conductor 99 through a connector 101 extending in a bore 102 formed in the sidewall of the housing 11 and serving to retain the conductor in vacuum sealed relation therein to the positive terminal of source 98 through a current limiting resistor 104 to thereby reverse bias the junction semiconductor. The output signal pulses are taken from the detector side of resistor 104 through D-C blocking capacitor 106.

Referring now more particularly to the entire apparatus as shown in FIGURE 1, it is seen the cryogenic counter 10 is supported vertically on a stand 107 together with the crystat 67. The detector 18 is connected to a preamplifier 108 which also supplies to the detector a bias voltage from a power supply 109 through wires 111. The pre-amplifier 108 receives signals from the detector which it pre-amplifies and supplies to a linear amplifier and pulse shaping network system 113, and to pulse analyzer 112 through conductors 114 and 115. Preferably, the pre-amplifier is a Model-323 available from Technical Measurements Corp., North Haven, Conn.

The pipes 21 and 44 are connected through valves 117 and 118 to vacuum and sample gas line 119 so that a vacuum may be produced in the chambers 12 and 73. The line 119 is connected to a vacuum gauge means including a sensor 121 and readout meter 122. The line 119 is also connected through valve 123 to a source of vacuum (not shown) and through a valve 124 to the gas sample storage means (not shown).

Let it be assumed that the detector is positioned so that it is spaced from the membrane 14, and the central portion of the membrane is accessible to the remaining volume with the chamber 12. The lower end of the detector cold finger is immersed in a cold bath 95, such as Dry Ice-acetone; but the liquid nitrogen well is left empty. All valves are closed. The operating procedure is as follows: Valves 117, 118, and 123 are opened and the chambers 12 and 73 are pumped down to a suitable low vacuum, say less than 5 microns. After reaching this vacuum, liquid nitrogen is fed into the container 51 to a level of about ½–⅔ its height and maintained at that level to thereby cool the central portion of the membrane 14 to liquid nitrogen temperatures.

Valve 118 is closed sealing the vacuum in the chamber 73, and valve 123 to the vacuum source is closed. Valve 124 to sample gas is opened in short bursts so that small amounts of sample gas are admitted into the chamber 12 where they condense on the cold central portion of the membrane 14. After each condensation and freezing, the pressure in the chamber 12 and lines will be that of the vapor pressure of the sample gas over frozen sample gas at liquid nitrogen temperature. As an example, for xenon gas the partial pressure over solid xenon (at this temperature) is about 50 microns. What that partial pressure is read over the meter 122 of the vacuum gauge, another burst of sample gas is admitted. This cycle is repeated until the entire sample has been transported into the chamber and frozen on the membrane 14. The detector 18 is then advanced upwardly into close proximity to the frozen sample for counting emanations therefrom in $2\pi$ geometry, or for a smaller solid angle it is adjusted to a lower level.

The detector 18 is cooled through the cold finger 94 Dry Ice-acetone bath 95 to thereby improve the resolution and hold down the noise level of the detector 18. The difference between the temperature of the central portion of the membrane 14 and the detector as maintained by cold finger 94 is of the order of 100° C. and is sufficient so that the gas sample to be counted cannot freeze at the higher temperature. For most gases, the above procedure is entirely satisfactory. For water vapor, however, the cold finger 94 and detector must remain warm until all the water vapor is condensed on the membrane, after which the detector may be cooled. In this way, condensation of the water vapor on the detector or other parts instead of the membrane is avoided.

In testing the apparatus, radioactive samples of $CO_2$ and xenon at STP and having a volume of about 2 cc. were admitted into the counter, condensed, and counted. Counting times varied with the amount of activity, but generally times of the order of 30 minutes to 400 minutes were found sufficient to count the radioactivity. The results of the count correspond to counts found by other means, and found satisfactory within the limits of the data.

Figure 3:
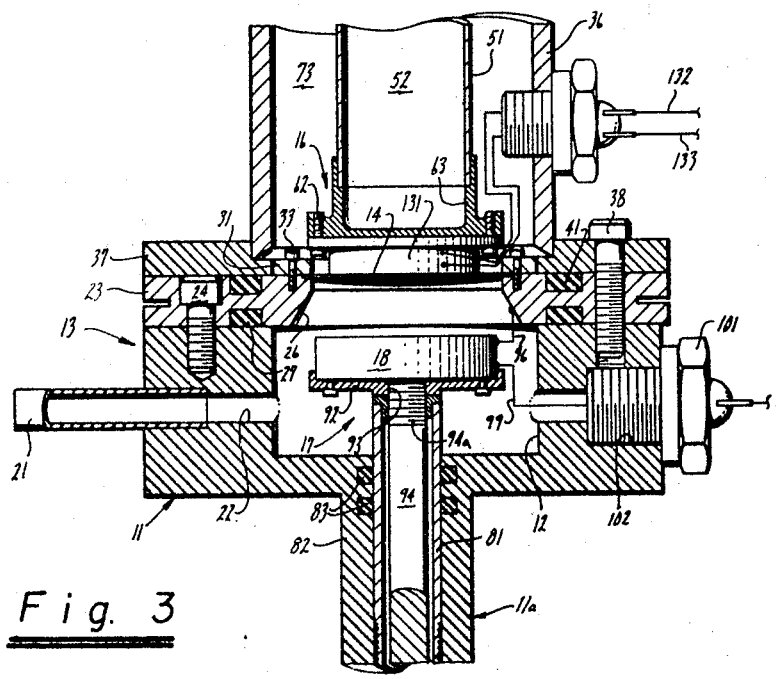
FIGURE 3 is an elevational view in cross-section, partly broken away, of another embodiment of the cryogenic counter using an alternate detector arrangement.

FIGURE 3 shows an alternate arrangement adapted for counting in $4\pi$ geometry. The member 61 has been removed and replaced with a second detector 131 of the same thickness. Thus, the detector 131 lies in thermal contact between the member 62 and the membrane 14 to thereby cool the membrane 14 and the record detector. Suitable electric conductors 132 and 133 and associated electronics (not shown) for supplying bias and processing output pulses are provided. Otherwise, the construction and operation of the gas counter are the same as previously described.

Figure 4:
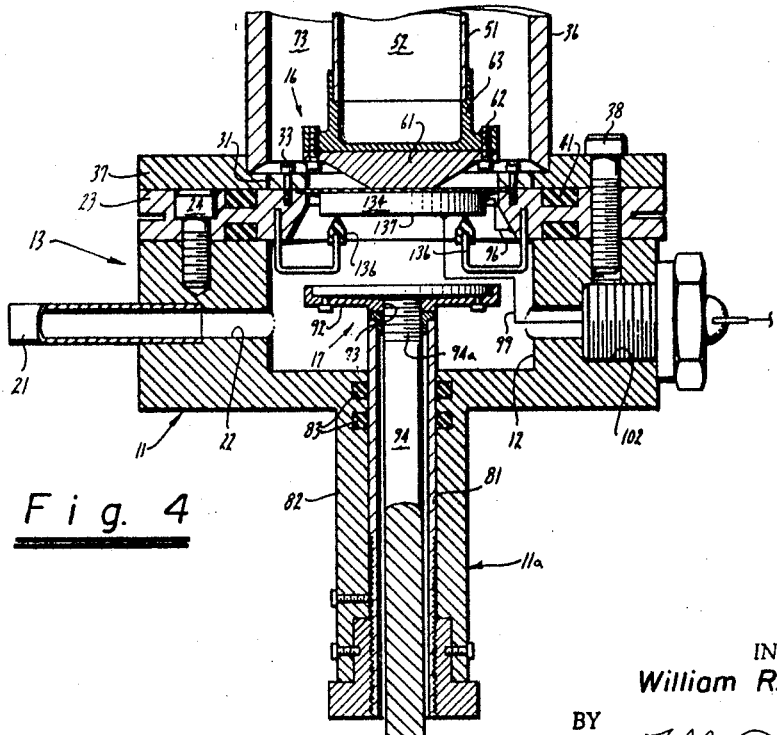
FIGURE 4 is an elevational view in cross-section, partly broken away, of still another embodiment of the cryogenic counter using another alternate detector arrangement.

FIGURE 4 shows another alternate detector arrangement adapted for operation of the single detector at liquid nitrogen temperature. A detector 134 rests on three fingers 136 mounted to the underside of the ring-like member so that the base of the detector 134 contacts the lower side of the membrane 14 from within the chamber 12. In this manner the detector 134 is cooled to sufficiently low temperature to cause incoming sample gas to condense on its exposed side 137 for counting thereat.

I have, therefore, shown a unique counter which is particularly adapted to count gas samples such as carbon dioxide, water vapor, or rare gases. Because of its novel operation, it is free of the disadvantages of heretofore known gas counters. In particular, the cryogenic gas counter of the invention should be of great value in the analysis of low levels of gaseous radioactive debris, tritium in water samples, such as are collected from ground waters, and also from air samples taken from the atmosphere wherein tritium has been created from nuclear explosions. Furthermore, the counter is very useful in counting low level emanations from carbon dioxide gas which possesses disadvantages in the gas phase when counted in proportional counter; for, carbon dioxide has an electronegative characteristic which tends to give counts due to this characteristic rather than from nuclear decay. In the present operation of the invention, the phase of the gas is changed to that of a solid in which any electronegative characteristic is completely suppressed. Thus, the invention also provides a novel method and apparatus for counting $CO_2$ directly which, it is believed, will be of great utility in age dating experiments with archaeological samples. In addition, the counting apparatus of the invention requires less sample material and is more sensitive than the conventional proportional counters.

The counter of the invention possesses a very low background count rate since the counting device is cooled, thereby effectively decreasing thermal and shot noise. Also, the energy resolution capability of solid state detector is very much larger than that of a gas in the proportional region. Thus, the energy spectrum of a radioactive gas can be determined and compared to the characteristic spectrum of known radioactive material. In this manner, isotopic analysis of the sample gas can be performed.

I claim:

1. In apparatus for measuring radiation from a radioactive gas, a housing having a chamber adapted to receive the gas therein, a cryostat assembly mounted on said housing and having a surface disposed in said chamber, a membrane disposed in said chamber and in contact with said surface, said cold jacket assembly serving to cool the membrane to cause said gas to condense thereon to form a condensate, and means for measuring the radiation from the condensate.

2. Apparatus as in claim 1 in which membrane is a plastic film.

3. Apparatus as in claim 1 in which said cryostat assembly maintains said membrane at liquid nitrogen temperature.

4. In apparatus for measuring radiation from a radioactive gas, a housing having a chamber formed therein adapted to receive a gas, said housing having an opening therein communicating with said chamber, a gas impervious membrane, means mounted on said membrane on said housing to close and seal said opening, a cryostat assembly mounted on said last named means and having a cold surface disposed against said membrane to cool the central portion of the same, said membrane being relatively thermally non-conductive so that only the portion of the membrane in contact with the said cold surface is cooled and to thereby cause the gas to condense on only said cooled portion of the membrane to form a condensate, and means for measuring the radiation from the condensate.

5. Apparatus as in claim 4 in which said means for measuring the radiation includes a solid state detector and mounting means for mounting said detector in said chamber for movement toward and away from said membrane.

6. Apparatus as in claim 5 in which said means for mounting said detector includes a cold finger adapted to cool the detector from a cold source outside the housing.

7. In apparatus for measuring radiation from a radioactive gas having a predetermined freezing temperature, a housing having a chamber formed therein adapted to receive the gas, said housing having an opening therein communicating with the chamber, a gas impervious membrane closing said opening, means mounted on said membrane and on said housing to close and seal the membrane housing and said last named means together into a unitary assembly, a cryostat assembly mounted on said last named means and having a cold surface disposed against said membrane to cool a central portion of the same to a temperature below the freezing temperature of the gas, said membrane being relatively thermally non-conductive so that only the portion of the membrane in contact with the cold surface is cooled so that when the gas is admitted into the chamber said gas condenses out only on said cooled portion of the membrane to form a condensate thereon, and means for measuring the radiation on the condensate.

References Cited
UNITED STATES PATENTS

| | | | |
|---|---|---|---|
| 2,985,758 | 5/1961 | Bosch | 250—83.3 |
| 3,281,596 | 10/1966 | Williston | 250—43.5 |
| 3,332,745 | 7/1967 | Bailey et al. | 73—23 X |

RALPH G. NILSON, Primary Examiner

SAUL ELBAUM, Assistant Examiner

U.S. Cl. X.R.

73—23; 250—43.5